(12) United States Patent
Tripathi et al.

(10) Patent No.: US 7,760,722 B1
(45) Date of Patent: *Jul. 20, 2010

(54) ROUTER BASED DEFENSE AGAINST DENIAL OF SERVICE ATTACKS USING DYNAMIC FEEDBACK FROM ATTACKED HOST

(75) Inventors: Sunay Tripathi, San Jose, CA (US); Radia J. Perlman, Sammamish, WA (US); Cahya Adiansyah Masputra, Millbrae, CA (US)

(73) Assignee: Oracle America, Inc., Redwood City, CA (US)

( * ) Notice: Subject to any disclaimer, the term of this patent is extended or adjusted under 35 U.S.C. 154(b) by 1077 days.

This patent is subject to a terminal disclaimer.

(21) Appl. No.: 11/256,254

(22) Filed: Oct. 21, 2005

(51) Int. Cl.
*H04L 12/28* (2006.01)
*G06F 15/16* (2006.01)
*G06F 7/04* (2006.01)

(52) U.S. Cl. .................. 370/389; 370/392; 370/412; 709/206; 726/4; 726/12; 726/30

(58) Field of Classification Search .................. None
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2002/0120702 A1* | 8/2002 | Schiavone et al. | 709/207 |
| 2002/0120853 A1* | 8/2002 | Tyree | 713/188 |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

*Primary Examiner*—Huy D Vu
*Assistant Examiner*—Brandon Renner
(74) *Attorney, Agent, or Firm*—Osha • Liang LLP

(57) ABSTRACT

An edge device including a first list and a second list, a first queue and a second queue configured to receive packets, wherein packet information for each of the packets forwarded to the first queue is on a first list and packet information for each of the packets forwarded to the second queue is not on the first list. The edge device is configured to, for each of the packets stored in the second queue, send a message to a host to send a first test to a source of the packet, wherein the host is operatively connected to the edge device, obtain a response to the first test from the host, place the packet information on the first list, if a successful response to the first test is received, and place the packet information on a second list, if an unsuccessful response to the first test is received.

20 Claims, 6 Drawing Sheets

U.S. PATENT DOCUMENTS

| | | |
|---|---|---|
| 2003/0037154 A1 | 2/2003 | Poggio et al. |
| 2003/0110400 A1* | 6/2003 | Cartmell et al. ............. 713/202 |
| 2004/0181571 A1* | 9/2004 | Atkinson et al. ............ 709/200 |
| 2004/0181581 A1* | 9/2004 | Kosco ........................ 709/206 |
| 2005/0015455 A1* | 1/2005 | Liu ............................. 709/207 |
| 2005/0132060 A1* | 6/2005 | Mo et al. .................... 709/227 |
| 2005/0135243 A1 | 6/2005 | Lee et al. |
| 2005/0138620 A1 | 6/2005 | Lewites |
| 2005/0204159 A1* | 9/2005 | Davis et al. ................. 713/201 |
| 2006/0026246 A1* | 2/2006 | Fukuhara et al. ............ 709/206 |
| 2006/0031680 A1* | 2/2006 | Maiman ...................... 713/182 |
| 2006/0041667 A1 | 2/2006 | Ahn et al. |
| 2006/0069782 A1* | 3/2006 | Manning et al. ............ 709/227 |
| 2006/0070066 A1 | 3/2006 | Grobman |
| 2006/0168033 A1* | 7/2006 | Cai et al. ..................... 709/206 |
| 2006/0168056 A1* | 7/2006 | Gandhi et al. ............... 709/206 |
| 2006/0174324 A1 | 8/2006 | Zur et al. |
| 2006/0271631 A1* | 11/2006 | Qureshi et al. .............. 709/206 |
| 2008/0168145 A1* | 7/2008 | Wilson ....................... 709/206 |
| 2008/0226047 A1* | 9/2008 | Reumann et al. ........ 379/142.04 |
| 2008/0229415 A1* | 9/2008 | Kapoor et al. ................. 726/22 |

* cited by examiner

ROUTER BASED DEFENSE AGAINST DENIAL OF SERVICE ATTACKS USING DYNAMIC FEEDBACK FROM ATTACKED HOST

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; and "Method and Apparatus for Processing Network Traffic Associated with Specific Protocols" with U.S. application Ser. No. 11/112,228; "Method and Apparatus for Monitoring Packets at High Data Rates" with U.S. application Ser. No. 11/226,790; "Method and Apparatus for Defending Against Denial of Service Attacks" with U.S. application Ser. No. 11/255,366 filed on the same day as this application.

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

With the rising popularity of offering critical services (e.g., web services, applications, identity services, mail services, etc.) on the Internet, attacks on the receiving system that offer such critical services have become relatively common. A common attack is a denial of service (DoS) attack where a sending system bombards a receiving system (i.e., host) with a large number of packets causing excessive amounts of endpoint, and possibly transit, network bandwidth (or resources) to be consumed. Such attacks are commonly referred to as packet flooding attacks. Recently, the use of source IP address spoofing during DoS attacks and the advent of distributed attack methods and tools have provided a continuing challenge in the area of DoS attack prevention.

The Internet is entirely composed of limited resources. Such limited resources as network bandwidth, processor resources, and storage capacities are all common targets for DoS attacks designed to consume enough of a host's available resources to cause some level of service disruption. One reaction to DoS attacks is to overprovision a system to handle excess loads that may be generated by the attack. However, a limit exists to the amount of limited resources that can be allocated to a system, both in terms of availability and cost. Accordingly, most of the service providers with any level of critical services on the Internet deploy various kinds of resource consumption monitors to assist in identifying when packet destinations (i.e., containers or services) are consuming excessive resources, such as network bandwidth and CPU resources, and/or subject to a DoS attack.

Attacks initiated on a single container or service, which is located on a single computer system with multiple containers and services, has the effect of disrupting all containers or services on the computer system. Consider an example where an Internet Service Provider (ISP) (e.g., Earthlink, AOL, Yahoo, etc.) hosts multiple websites on the same physical computer system by establishing several containers, which are virtual application environments. If only one of the websites hosted on the same computer system is under a DoS attack, then the entire computer system grinds to a halt and all other containers on the same computer system suffer. Customers running multiple services on the same machine are faced with the same problem. For example, if a customer runs a http and a https based service on the same computer system and a DoS attack is initiated against just one service, all services on that computer system grind to a halt.

SUMMARY

In general, in one aspect the invention relates method for processing packets, comprising receiving a packet from a network by an edge device, wherein the edge device comprises a first list and a second list, analyzing the packet to obtain packet information used to determine to which temporary data structure to forward the packet, if the first list comprises the packet information: forwarding the packet to a first queue, and processing the packet from the first queue, and if the first list does not comprise the packet information: forwarding the packet to a second queue, processing the packet, wherein processing the packet comprises: sending a message to a host operatively connected to the edge device to send to a first test to a source of the packet, sending the first test to the source of the packet by the host using the packet information, obtaining a response to the first test by the host, forwarding the response to the edge device placing the packet information on the first list, if a successful response to the first test is received, and placing the packet information on a second list, if an unsuccessful response to the first test is received.

In general, in one aspect the invention relates An edge device, comprising a first list and a second list comprising packet information, a first queue configured to receive packets, wherein packet information for each of a plurality of packets forwarded to the first queue is on a first list, a second queue configured to receive packets, wherein packet information for each of the plurality of packets forwarded to the second queue is not on the first list, wherein the edge device is configured to, for each of the plurality of packets stored in the second queue: send a message to a host to send to a first test to a source of the packet, wherein the host is operatively connected to the edge device, obtain a response to the first test from the host, place the packet information on the first list, if a successful response to the first test is received, and place the packet information on a second list, if an unsuccessful response to the first test is received.

In general, in one aspect the invention relates An edge device, comprising a first list and a second list comprising packet information, a first queue configured to receive packets, wherein packet information for each of a plurality of packets forwarded to the first queue is on a first list, a second queue configured to receive packets, wherein packet information for each of the plurality of packets forwarded to the second queue is not on the first list, wherein the edge device is configured to, for each of the plurality of packets stored in the second queue: send a first test a source of the packet, obtain a response to the first test from the source of the packet, place the packet information on the first list, if a successful response to the first test is received, and place the packet information on a second list, if an unsuccessful response to the first test is received, and wherein the edge device is configured to, for each of the plurality of packets stored in the first queue: send the packet to a host operatively connected to the edge device.

In general, in one aspect, the invention relates to a computer readable medium, comprising instructions for receiving a packet from a network by an edge device, wherein the edge device comprises a first list and a second list, analyzing the packet to obtain packet information used to determine to which temporary data structure to forward the packet, if the first list comprises the packet information: forwarding the packet to a first queue, and processing the packet from the first queue, and if the first list does not comprise the packet information: forwarding the packet to a second queue, processing the packet, wherein processing the packet comprises: sending a message to a host operatively connected to the edge device to send to a first test to a source of the packet, sending the first test to the source of the packet by the host using the packet information, obtaining a response to the first test by the host, forwarding the response to the edge device placing the packet information on the first list, if a successful response to the first test is received, and placing the packet information on a second list, if an unsuccessful response to the first test is received.

Other aspects of the invention will be apparent from the following description and the appended claims.

DETAILED DESCRIPTION

Figure 1:
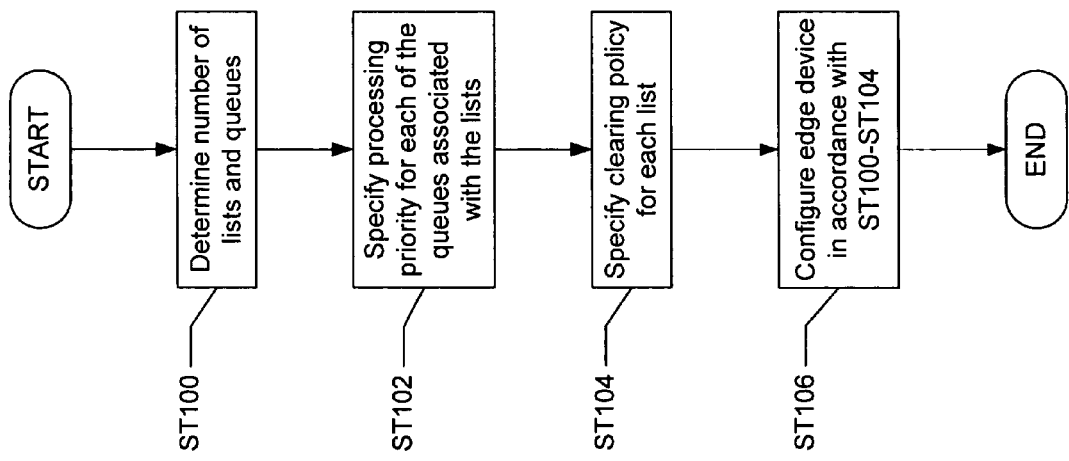
FIG. 1 shows a flowchart in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for defending against a denial of service attack. More specifically, embodiments of the invention relate to a method and apparatus for defending against a denial of service (DoS) attack using an edge device, a Turing test, a DoS countermeasure policy, and functionality to support dynamic feedback between the attacked host and the router.

In one embodiment of the invention, an edge device corresponds to any device that is interposed between the outside network (e.g., the Internet, other external wide area networks, local area networks, etc.) and hosts of a particular entity (e.g., hosts used to support a website, etc.). Examples of edges devices include routers and load balancers. These examples are not intended to limit the scope of edge devices. In one embodiment of the invention, each edge device is configured in accordance with a DoS countermeasure policy. In general, the DoS countermeasure policy specifies the configuration of the edge device when the DoS countermeasures are activated (i.e., the configuration of the device when the edge device has detected (or been informed) that it is under a DoS attack).

In one embodiment of the invention, the DoS countermeasure policy corresponds to the number of lists used to counter a DoS attack. Those skilled in the art will appreciate that the DoS countermeasure policy may specify any number of lists and corresponding queues that are used to counter a DoS attack. The operation of the lists and queues is described below. In addition, the DoS countermeasure policy may specify processing priority associated with each of the queues. Further, the DoS countermeasure policy may specify under what circumstances the DoS countermeasure policy is activated. In one embodiment of the invention, the system may include more than one DoS countermeasure policy. In such scenarios, each DoS countermeasure policy may be activated in response to a different set of circumstances. For example, a first DoS countermeasure policy may be activated when there is a light DoS attack in progress and a second DoS countermeasure policy may be activated when there is a heavy DoS attack in progress. Those skilled in the art will appreciate that the terms "heavy" and "light" are relative terms and may be defined, for example, on a per-edge device basis. The various embodiments of the DoS countermeasure policy mentioned above are discussed below.

FIG. 1 shows a method for configuring an edge device in accordance with one embodiment of the invention. Initially, a number of lists and queues to counter a DoS attack is determined (ST100). Subsequently, a processing priority for each of the queues associated with the aforementioned lists is determined (ST102). In one embodiment of the invention, setting a queue at a specific processing priority (high, low, etc.) defines the order in which the packets are processed off of the queues. Those skilled in the art will appreciate that the terms "high" and "low" are intended to convey a relative priority as opposed to an absolute priority.

Once processing priority has been specified, a clearing policy is specified for each list specified in ST104. In one embodiment of the invention, the contents of all of the aforementioned lists are cleared periodically (e.g., after a certain period of time or after a certain event). In one embodiment of the invention, each of the aforementioned lists is cleared every 2-5 minutes. Those skilled in the art will appreciate that each of the aforementioned lists may be cleared at a different amount of time has elapsed. Alternatively, each entry in the list (i.e., the packet information corresponding to an individual packet or set of packets) is cleared on per-entry basis (i.e., each entry is present on the list for only a certain period of time or after a certain event). In one embodiment of the invention, each entry is present on the list from no more than 5 minutes. At this stage, the minimal information necessary to program the edge device has been obtained. Those skilled in the art will appreciate that the information obtained in ST100-ST104 may be obtained from a DoS countermeasure policy. Once the aforementioned information has been obtained, the edge device may be configured in accordance with ST100-ST104.

The following is an example of a DoS countermeasure policy in accordance with one embodiment of the invention. The DoS countermeasure policy specifies that there should be two lists and two queues, where each queue is associated with a different processing priority. Further, the edge device includes the necessary functionality to obtain packet information (e.g., source IP address, destination IP address, source TCP port, destination TCP port, etc.) from the packet, determine if the packet information is any of the lists, and forward the packet (if appropriate) to one of two queues depending on whether or not packet information associated with the packet is present on either of two lists. In addition, the contents of the aforementioned lists should be cleared periodically (e.g., after a certain period of time) based on a clearing policy.

Figure 2:
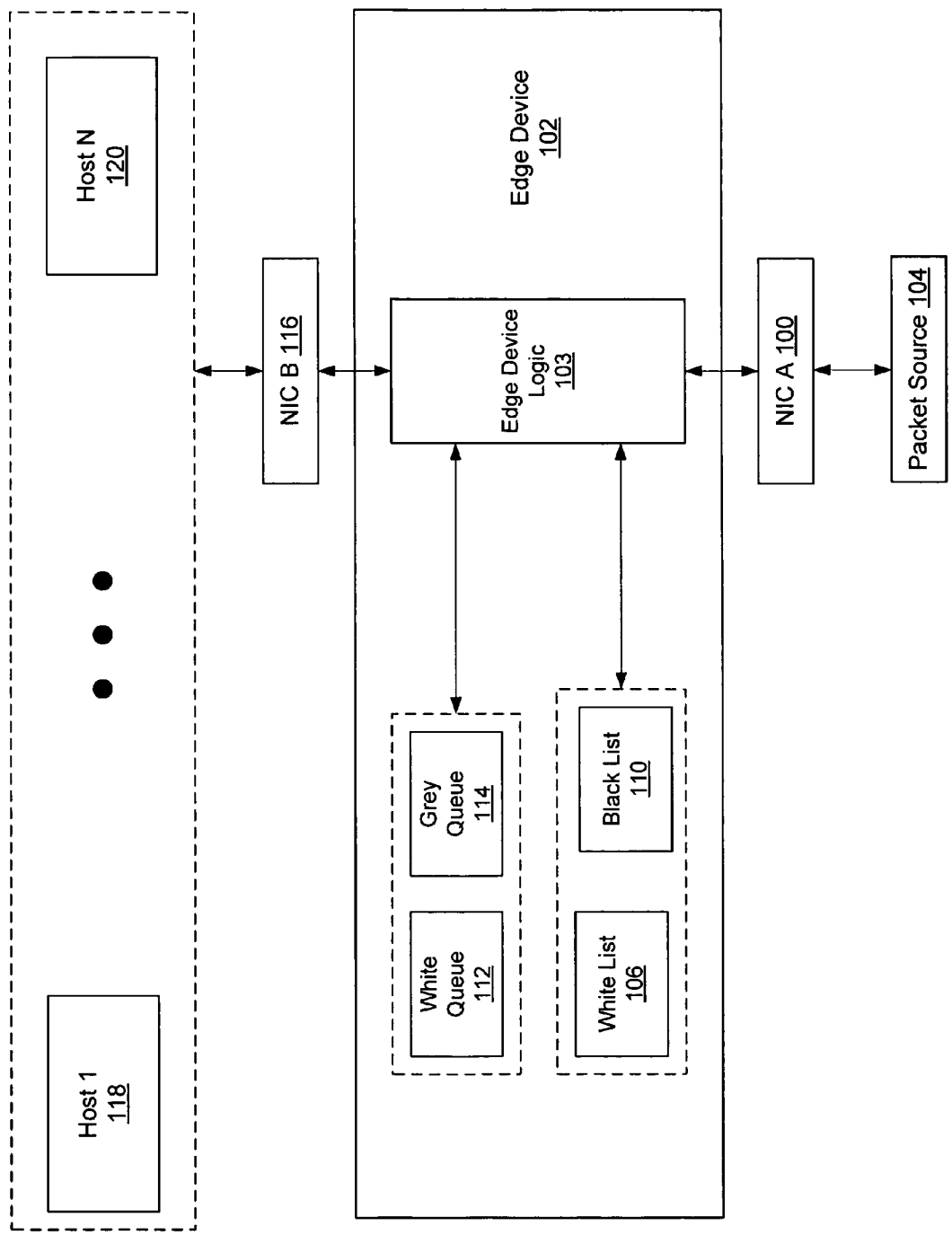
FIGS. 2 and 3 show systems in accordance with one embodiment of the invention.

FIG. 2 shows a system implementing the aforementioned DoS countermeasure policy in one embodiment of the invention. The DoS countermeasure policy is exemplary in nature and not intended to limit the scope of the invention. The system shown in FIG. 2 implements the aforementioned DoS countermeasure policy in the following manner. Specifically, as shown in FIG. 2, the edge device (102) includes two lists: a white list (106) and a black list (110). In one embodiment of the invention, the white list (106) includes packet information associated with packets that have previously passed a Turing Test (discussed below in FIG. 5). In contrast, the black list (110) includes packet information associated with packets that have not previously passed a Turing Test (discussed below in FIG. 5). Those skilled in the art will appreciate that the aforementioned lists may be stored in any form of memory (i.e., RAM, cache, etc.). Further, the content of the lists (i.e., the packet information, etc.) may be organized using any organizational scheme (i.e., a linked list, an array, a file system, a hash table, as entries in a directory, etc.)

The edge device (102) also includes edge device logic (103) that is configured to analyze the incoming network traffic, typically in the form of packets, received from the network (e.g., packet source (104)), and forward the packets to the appropriate queues (e.g., white queue (112) and grey queue (114)) using the white list (106) and the black list (110). In one embodiment of the invention, the edge device logic (103) is configured to place packets whose packet information is on the white list (106) in the white queue (112), to drop packets whose packet information is on the black list (110), and to place packets on the grey queue (114) if the packet information is not on the white list (106) or the black list (110).

Once the packets are placed on the queues (e.g., 112, 114), the packets remain on the queues until the packets are processed. In one embodiment of the invention, processing a packet on the queue includes forwarding the packet to a host (e.g., 118, 120) operatively connected to the edge device (102).

In some instances, the packets are forwarded to the host along with a message that indicates the host is sending a Turing test (described below) to the source of the packet and reporting the response of the Turing test to the edge device (102) (discussed below in FIG. 5). In addition, the edge device logic (103) is configured to update the contents of the white list (106) and the black list (110) based on the response received from the host (118, 120) regarding the Turing test. In accordance with the DoS countermeasure policy, the white queue (112) is set at a higher processing priority than the grey queue (114).

Those skilled in the art will appreciate that the amount of packet information stored in the white list (106) and the black list (110) may vary depending on the implementation and the list. For example, the white list (106) may store the source IP address as one entry in the list and the full connection information (e.g., source IP address, destination IP address, source TCP port, destination TCP port) of the connection with which the packet is associated with another entry in the list. Thus, all packets associated with the connection as well as all packets from the same source IP address that are subsequently received are forwarded to the white queue (114). The black list (110) may also store the packet information in a similar manner. However, in other scenarios, the white list may only store the full connection information and the black list may only store the source IP address. Those skilled in the art will appreciate that the invention is not limited to the above examples of list implementations.

Following is another example of a DoS countermeasure policy in accordance with one embodiment of the invention. The DoS countermeasure policy specifies that there should be four lists and four queues, where each queue is associated with a different processing priority. Further, the edge device includes the necessary functionality to obtain packet information from the packet, determine whether the packet information is included on any of the lists, and forward packet (if appropriate) to one of four queues depending on whether packet information associated with the packet is present on any of the four lists. In addition, the contents of the aforementioned lists should be cleared periodically.

Figure 3:
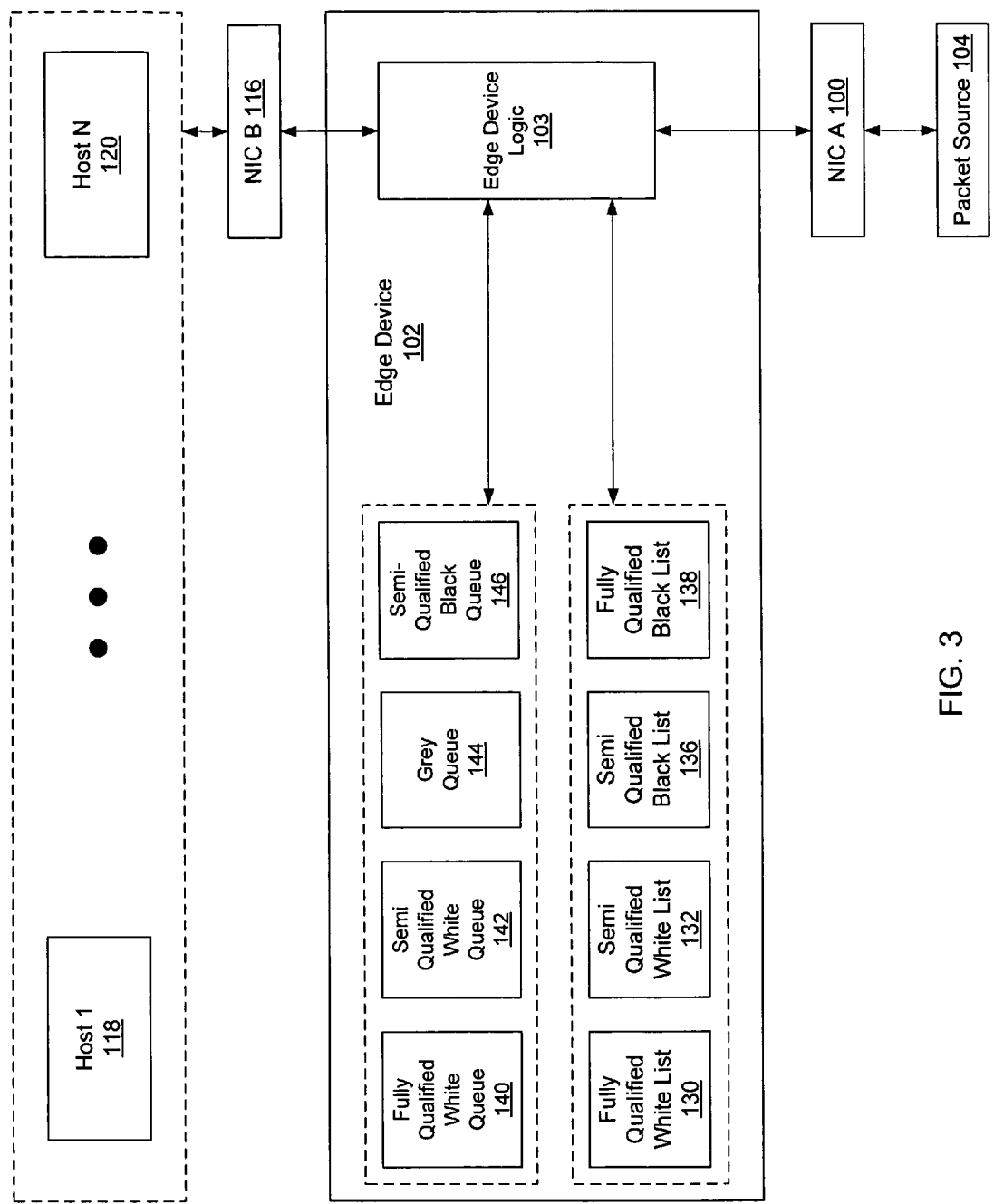

FIG. 3 shows a system implementing the aforementioned DoS countermeasure policy in one or more embodiments of the invention. The DoS countermeasure policy is exemplary in nature and not intended to limit the scope of the invention.

The system shown in FIG. 3 implements the aforementioned DoS countermeasure policy in the following manner. Specifically, the edge device (102) includes a fully-qualified white list (130), a semi-qualified white list (132), a semi-qualified black list (136), and a fully-qualified black list (138). In accordance with the aforementioned DoS countermeasure policy, the fully-qualified white list (130) is configured to store full connection information associated with each packet whose source has provided a successful response to the Turing test. The semi-qualified white list (132) is configured to store the source IP address of each source that has provided a successful response to the Turing test. Those skilled in the art will appreciate that the when a successful response to the Turing test is received, both the fully-qualified white list and the semi-qualified white list may be populated using packet information associated with the same packet. For example, the full connection information associated with the packet may be stored in the fully-qualified white list, while the source IP address of the packet may be stored in the semi-qualified black list. Accordingly, when a subsequent packet arrives from same source on the same connection as the aforementioned packet, the subsequent packet is placed on the fully-qualified white queue. However, if the subsequent packet is only from the same source but on a different connection, then the subsequent packet is placed on the semi-qualified white queue.

Similarly, in accordance with the aforementioned DoS countermeasure policy, the fully-qualified black list (138) is configured to store full connection information associated with each packet whose source has provided an unsuccessful response (which also may include a failure to respond) to the Turing test. The semi-qualified black list (136) is configured to store the source IP address of each source that has provided an unsuccessful response to the Turing test. Those skilled in the art will appreciate that when an unsuccessful response to the Turing test is received (or no response is received), both the fully-qualified black list (138) and the semi-qualified black list (136) may be populated using packet information associated with the same packet. For example, the full connection information associated with the packet may be stored in the fully-qualified black list (138), while the source IP address of the packet may be stored in the semi-qualified black list (136). Accordingly, when a subsequent packet arrives from same source on the same connection as the aforementioned packet, the subsequent packet is placed on the fully-qualified black queue. However, if the subsequent packet is only from the same source but on a different connection, then the subsequent packet is placed on the semi-qualified black queue.

The edge device (102) also includes edge device logic (103) that is configured to analyze the incoming network traffic, typically in the form of packets, received from the network (e.g., packet source (104)), and forward the packets to the appropriate queues (e.g., fully-qualified white queue (140), the semi-qualified white queue (142), the grey queue (144), the semi-qualified black queue (146)) using the fully-qualified white list (130), the semi-qualified white list (132), the semi-qualified black list (136), and the fully-qualified black list (138). In one embodiment of the invention, the edge device logic (103) is configured to place packets whose packet information is on the fully-qualified white list (130) in the fully-qualified white queue (140), to place packets whose packet information is on the semi-qualified white list (132) in the semi-qualified white queue (142), to place packets whose packet information is on the semi-qualified black list (136) in the semi-qualified black queue (146), to drop packets whose packet information is on the fully-qualified black list (138), and to place packets on the grey queue (144) if the packet information is not any of the aforementioned lists.

Once the packets are placed on the queues (e.g., 140, 142, 144, 146), the packets remain on the queues until the packets are processed. In one embodiment of the invention, processing a packet on the queue includes forwarding the packet to a host (e.g., 118, 120) operatively connected to the edge device (102).

In some instances, the packets are forwarded to the host along with a message that indicates the host is to send a Turing test (described below) to the source of the packet and report the response of the Turing test to the edge device (102) (discussed below in FIG. 5). In addition, the edge device logic (103) is configured to update the contents of the fully-qualified white list (130), the semi-qualified white list (132), the semi-qualified black list (136), and the fully-qualified black list (138) based on the response received from the host (118, 120) regarding the Turing test.

In accordance with the DoS countermeasure policy, the fully qualified white queue (140) is set at a higher processing priority than the semi-qualified white queue (142). Further, the semi-qualified white queue (142) is set at a higher processing priority than the grey queue (144). Further, the grey queue (144) is set at a higher processing priority than the semi-qualified black queue (146). As discussed above, those skilled in the art will appreciate that the amount of packet information stored in the fully-qualified white list (130), the semi-qualified white list (132), the semi-qualified black list (136), and the fully-qualified black list (138) may vary depending on the implementation and the list.

Figure 4:
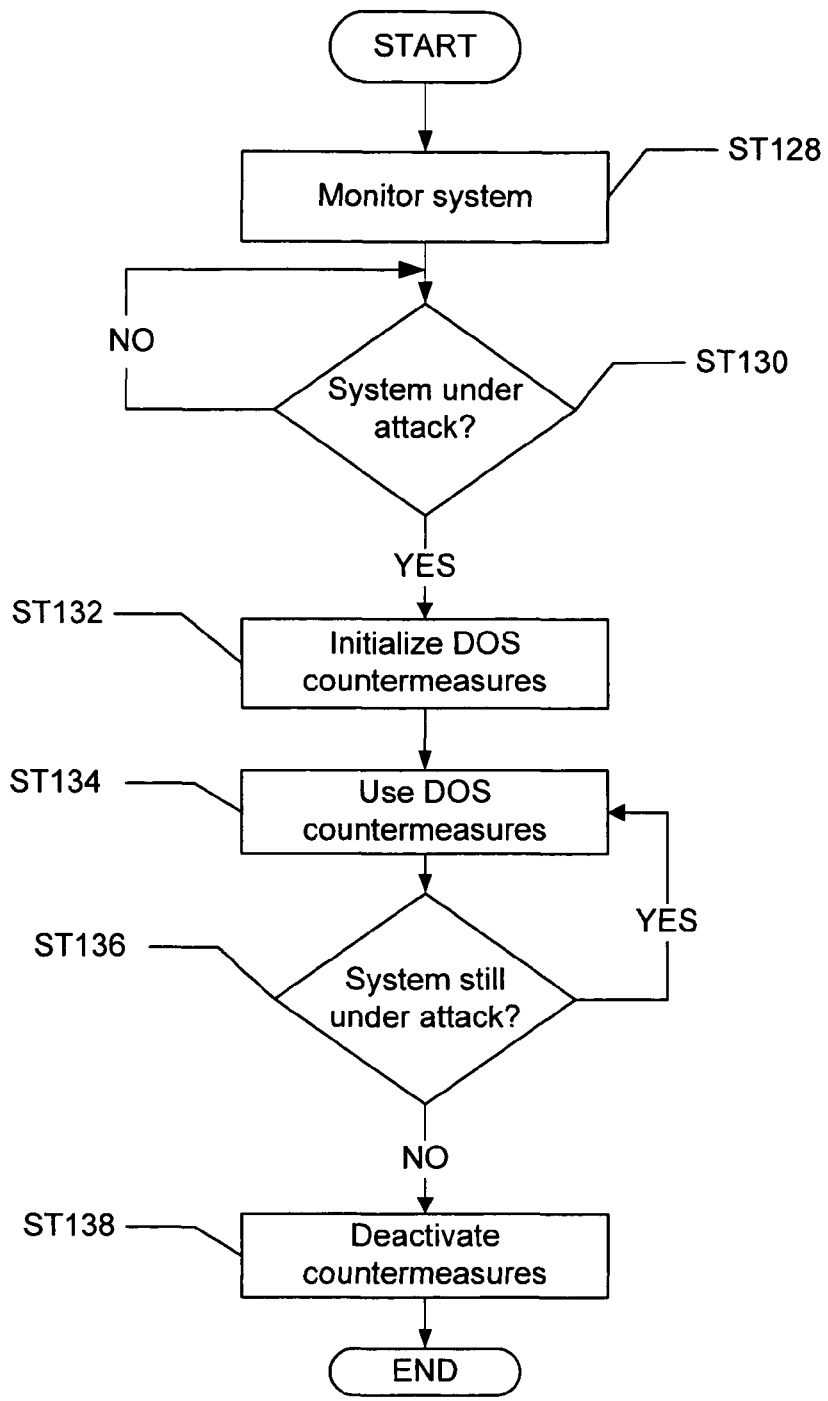
FIGS. 4 and 5 show flowcharts in accordance with one embodiment of the invention.

FIG. 4 shows a flowchart in accordance with one embodiment of invention. Initially, the system is monitored (ST128). In one embodiment of the invention, the system monitoring may include monitoring the volume of network traffic received by the system (as well as other characteristics of the system) to determine whether the system is under a DoS attack. Those skilled in the art will appreciate that the determination of whether the system is under a DoS attack may be determined using techniques well known in the art.

If a DoS attack is occurring (ST130), the system proceeds to initialize the DoS countermeasures (ST820). In one embodiment of the invention, initializing the DoS countermeasures may include configuring the edge device in accordance with the DoS countermeasure policy, for example, as shown in FIG. 2 or 3. Alternatively, initializing the DoS countermeasures may include activating the DoS countermeasures that have been previously configured. The DoS countermeasures are subsequently used to defend against the DoS attack (discussed in FIG. 5).

Periodically, a determination is made whether the system is still under attack (ST136). If the system is still under attack, the DoS countermeasures continue to be used until such time as the attack is terminated. Once a determination is made that the system is no longer under attack, the system proceeds to deactivate the DoS countermeasures and resume normal operation (ST138).

Figure 5:
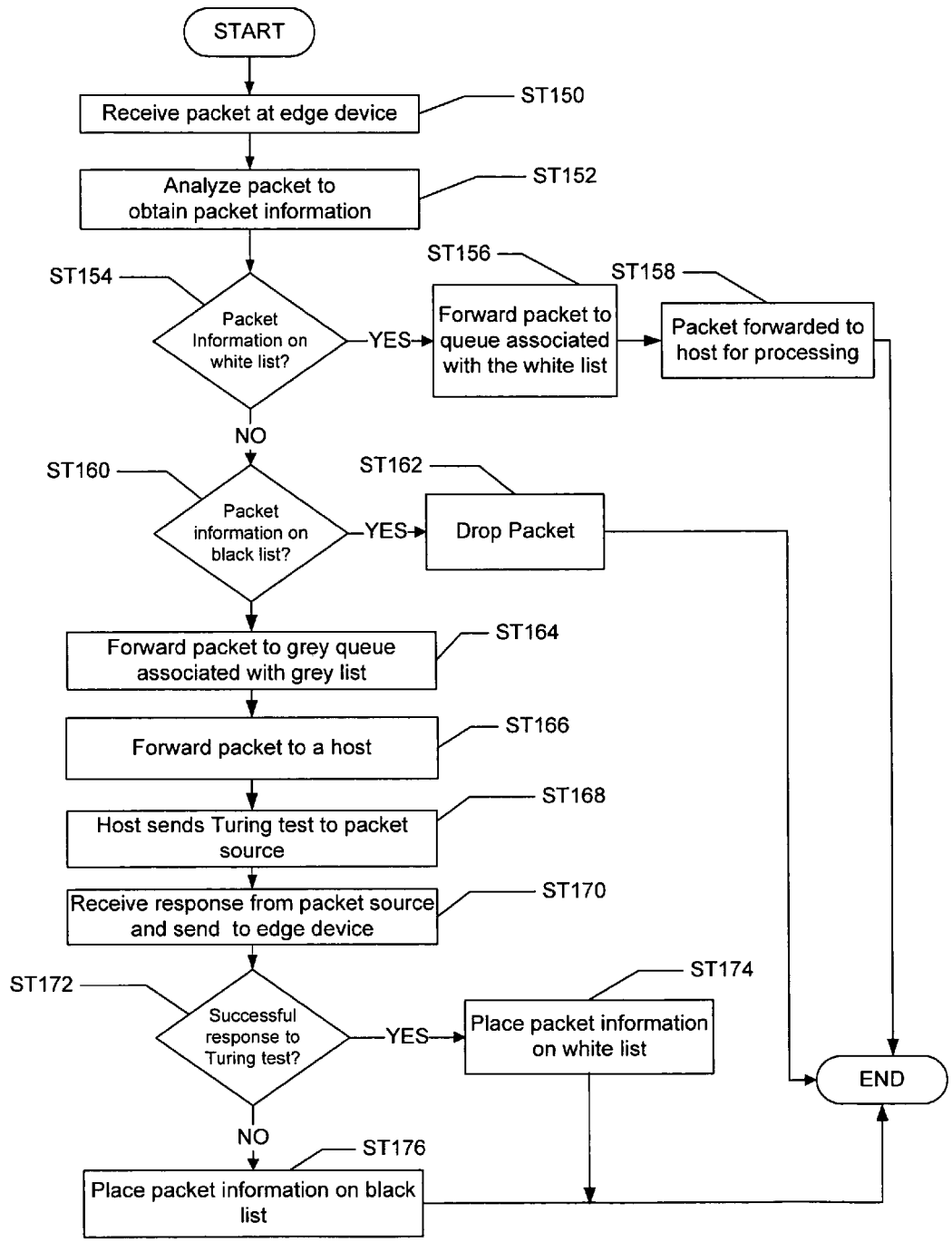

FIG. 5 shows a flowchart for using the DoS countermeasure policy shown in FIG. 2, once an attack has been detected and the DoS countermeasures have been initialized. Initially, a packet is received by the edge device (ST150). The packet is subsequently analyzed to obtain packet information (ST152). The edge device logic subsequently uses the packet information to determine to which queue to forward the packet. More specifically, the edge device logic is configured such that if the packet information (or a portion thereof) associated with the packet is on the white list (ST154), then the packet is forwarded to the white queue (ST156). The packet is subsequently forwarded to the host for processing (ST158). Processing of the packets that were forwarded to the white receive ring corresponds to processing that would have occurred during normal operation (i.e., if the DoS countermeasures were not activated).

The edge device is also configured such that if the packet information (or a portion thereof) associated with the packet is on the black list (ST160), then the packet is dropped (i.e., the packet is not processed) (ST162). Those skilled in the art will appreciate that instead of dropping the packet, the packet may be placed on a black queue (not shown in FIG. 2) and subsequently processed at lower priority than the packets on the grey queue (114 in FIG. 2).

Finally, the edge device is configured such that if the packet information (or a portion thereof) associated with the packet is not on the white list or the black list, then the packet is forwarded to the grey queue (ST164). The packet is subsequently forwarded from the grey queue to a host (ST166).

Upon receiving the packet from the edge device, the host sends a Turing test to the source of the packet (ST1168). In one embodiment of the invention, the Turing test corresponds to any test that requests a user to provide a response and the response cannot be computer generated (i.e., without the aid of a user). A common example of a Turing test is an image that contains a word (or alphanumeric sequence) written in a manner that cannot be understood by a computer. In response to receiving the image, the user is requested to type in the word (or alphanumeric sequence). The purpose of the Turing test is to ensure that a system controlled by a user, as opposed to a system acting on its own or controlled by another system, is sending the packets to the host. Those skilled in the art will appreciate that the invention is not limited to using a Turing test; rather, the invention may be implemented using any test that requires a user to provide a response, where the response cannot be computer generated.

Continuing with the discussion of FIG. 5, the response to the Turing test is subsequently received by the host from the source of the packet. The host, in turn, sends the received response to the edge device (ST170). The response is subsequently analyzed by the edge device logic (ST172). If a successful response to the Turing test is received, the packet information (or a portion thereof) associated with the packet is placed on the white list (ST174). However, if an unsuccessful response (including no response) to the Turing test is received, the packet information (or a portion thereof) associated with the packet is placed on the black list (ST176). Those skilled in the art will appreciate, that the source of the packet (i.e., the system sending the packet to the host) may be allowed to fail the Turing test a specific number of times prior to packet information (or portion thereof) being placed on the black list.

In view of the flowchart in FIG. 5, packets from sources that had previously satisfied the Turing test are processed as if the edge device was operating without the DoS countermeasures. However, packets from sources that previously provided unsuccessful responses to the Turing test are prevented from being processed in a manner that would significantly impact the system by dropping such packets or placing packets on a queue with a low processing priority (within the edge device). Finally, the packets about which nothing was known (i.e., packets to the grey queue) are given an opportunity to prove that they are valid packets (i.e., not packets associated with a DoS attack) by successfully responding to the Turing test. Depending on the results of the Turing test, the packets on the grey queue would then be subject to the processing constraints associated with the white or black queues. Thus, the embodiments of the aforementioned approach provide a method and apparatus for effectively defending against DoS attacks.

Further, embodiments of the invention provide a mechanism to enable hosts within the system to provide dynamic feedback to the edge device. More specifically, by placing the lists and queues in the edge device, all hosts can benefit from information obtained by any other host in the system. Said another way, if one host in the system discovers that the a particular packet source is malicious (i.e., the packet source fails the Turing test), then by storing this information in the form of an entry in the black list on the edge device allows the edge device to prevent the packet source from sending packets to any other host. Similarly, if one host has confirmed that a packet source is non-malicious (i.e., the packet source passed the Turing test), this information is reflected in the while list and, as such, other hosts in the system do not need to use additional overhead to determine if packets from that packet source are valid.

In one embodiment of the invention, the above described lists and queues may be implemented using the receive rings (or virtual NIC queues) and virtual serialization queues, respectively, as described in U.S. application Ser. No. 11/255,366 filed on Oct. 21, 2005, entitled "METHOD AND APPARATUS FOR DEFENDING AGAINST DENIAL OF SERVICE ATTACKS," assigned to the assignee of this application, and hereby incorporated by reference. Thus, the edge device includes the architecture of the host described in U.S. patent application Ser. No. 11/255,366 filed on Oct. 21, 2005, entitled "METHOD AND APPARATUS FOR DEFENDING AGAINST DENIAL OF SERVICE ATTACKS." However, unlike the host described in U.S. patent application Ser. No. 11/255,366 filed on Oct. 21, 2005, entitled "METHOD AND APPARATUS FOR DEFENDING AGAINST DENIAL OF SERVICE ATTACKS", the edge device in this embodiment does not perform the Turing test; rather, the edge device sends messages to various hosts (e.g., 118, 120 in FIG. 2) to administer the Turing test and provide the edge device with the results.

In one embodiment of the invention, instead of the edge device using the hosts to perform the Turing test, the edge device performs the Turing test. In this scenario, assuming the DoS countermeasure policy shown in FIG. 2, the packets forwarded to the white queue are sent (at a high processing priority) to the hosts (118, 120). Further, the packets forwarded to the grey queue as processed (i.e., a Turing test is sent to the source of the packet from the edge device) at a lower processing priority than the packets on the white queue. Finally, all other packets (i.e., packets whose packet information is on the black list) are dropped.

Figure 6:
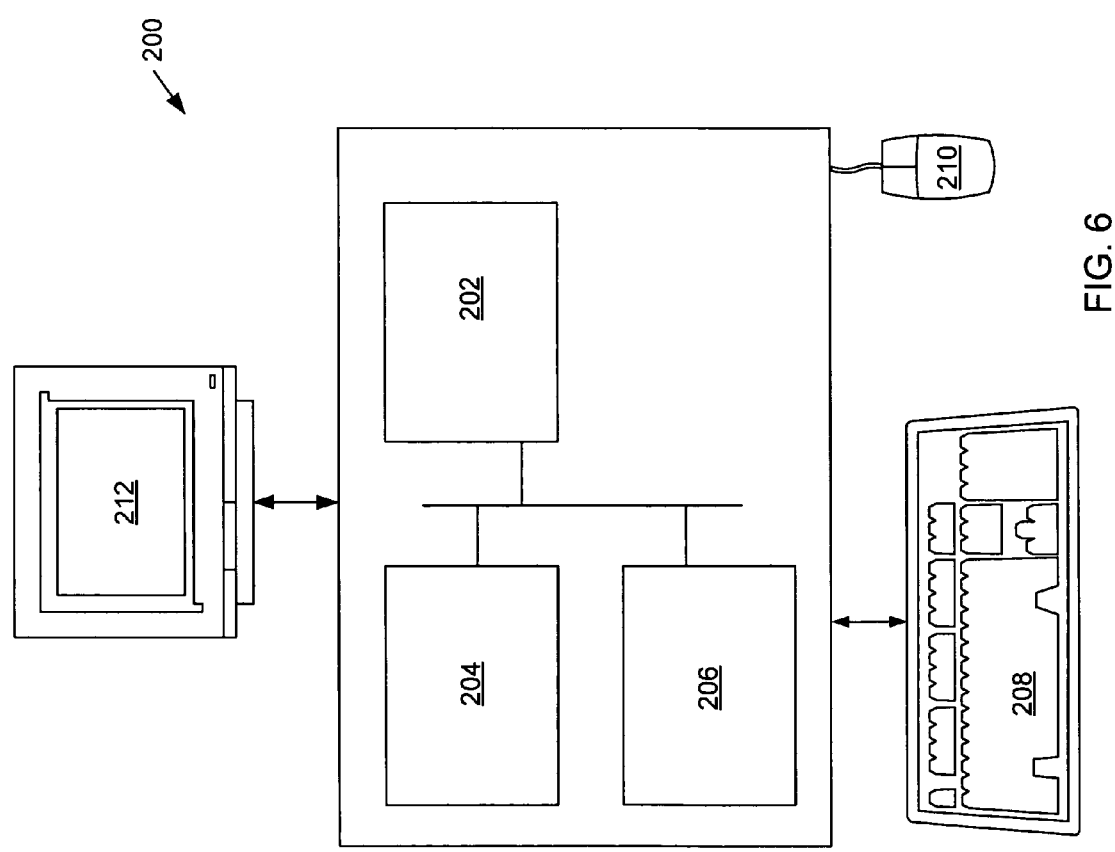
FIG. 6 shows a computer system in accordance with one embodiment of the invention.

An embodiment of the invention may be implemented on virtually any type of computer regardless of the platform being used. For example, as shown in FIG. 6, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing packets, comprising:
receiving a first packet from a network by an edge device, wherein the edge device comprises a first list and a second list, wherein first list is associated with a first queue, the second list is associated with a second queue, and wherein the first packet is directed to a first host;

analyzing, by the edge device, the first packet to obtain first packet information used to determine to which temporary data structure to forward the first packet, wherein the first packet information identifies a source of the first packet;

in response to determining that the first list does not specify the source:

forwarding, by the edge device, the first packet to the second queue, processing the first packet from the second queue, wherein processing the first packet from the second queue comprises:

sending a message to the first host operatively connected to the edge device to send a first test to the source;

sending the first test to the source by the first host using the packet information, obtaining an unsuccessful response to the first test by the host;

forwarding, by the host, the unsuccessful response to the edge device; and placing the first packet information on the second list based on the unsuccessful response to the first test;

receiving a second packet from the network by the edge device, wherein the second packet is directed to a second host;

after receiving the second packet:

analyzing, by the edge device, the second packet to obtain second packet information, wherein the second packet information identifies that the second packet was received from the source; and in response to determining that the second list comprises the source, dropping the second packet by the edge device.

2. The method of claim 1, wherein packets in the first queue are processed at a higher processing priority than packets in the second queue.

3. The method of claim 1, wherein the first test is a Turing test.

4. The method of claim 1, wherein analyzing the first packet information to determine to which queue to forward the first packet is performed after the edge device has detected a denial of service attack.

5. The method of claim 1, wherein the edge device is a router.

6. The method of claim 1, wherein the first queue is a virtual serialization queue.

7. The method of claim 1, wherein the first list and the second list are cleared periodically.

8. The method of claim 1, wherein the first list is cleared after a specific amount of time has elapsed.

9. The method of claim 1, wherein the packet information comprises at least one selected from the group consisting of a source Internet Protocol (IP) address, a destination IP address, a Source Transmission Control Protocol (TCP) port, and a destination TCP port.

10. The method of claim 1, wherein the second packet is directed to the second host when the second host is to receive the second packet to comply with load balancing requirements specified by the edge device.

11. An edge device, comprising:

a first list and a second list comprising packet information;

a first queue configured to receive packets, wherein packet information for each of a plurality of packets forwarded to the first queue is on a first list;

a second queue configured to receive packets, wherein packet information for each of the plurality of packets forwarded to the second queue is not on the first list;

wherein the edge device is configured to:

receive a first packet of the plurality of packets from a network, wherein the first packet is directed to a first host;

analyze the first packet to determine that packet information of the first packet is not in the first list, wherein the packet information of the first packet identifies a source of the first packet;

forward the first packet to the second queue based on the source not being specified in the first list;

process the first packet from the second queue, wherein processing the first packet comprises:

sending a message to the first host to send a first test to the source, wherein the first host is operatively connected to the edge device, and wherein the host obtains, in response to the first test, an unsuccessful response from the source;

obtaining the unsuccessful response to the first test from the host; and placing the first packet information on the second list based on the unsuccessful response to the first test;

receive a second packet of the plurality of packets from the network, wherein the second packet is directed to a second host;

after receiving the second packet:

analyze the second packet to obtain packet information of the second packet, wherein the packet information of the second packet identifies that the second packet was received from the source; and in response to determining that the second list comprises the source, dropping the second packet by the edge device.

12. The edge device of claim 11, wherein the edge device is a router.

13. The edge device of claim 11, wherein the first test is a Turing test.

14. The edge device of claim 11, wherein packets on the first queue are processed at a higher processing priority than packets on the second queue.

15. The edge device of claim 11, wherein the first list and the second list are cleared periodically.

16. The edge device of claim 11, wherein the first list is cleared after a specific amount of time has elapsed.

17. The edge device of claim 11, wherein the first queue is a virtual serialization queue.

18. The edge device of claim 11, wherein the second packet is directed to the second host when the second host is to receive the second packet to comply with load balancing requirements specified by the edge device.

19. A computer readable medium, comprising instructions stored thereon for:

receiving a first packet from a network by an edge device, wherein the edge device comprises a first list and a second list, wherein the first list is associated with a first queue, wherein the second list is associated with a second queue, and wherein the first packet is directed to a first host;

analyzing, by the edge device, the first packet to obtain first packet information used to determine to which temporary data structure to forward the first packet, wherein the packet information identifies a source of the first packet;

in response to determining that the first list does not specify the source:

forwarding, by the edge device, the first packet to the second queue, processing the first packet from the second queue, wherein processing the first packet from the second queue comprises:

sending a message to the first host operatively connected to the edge device to send a first test to the source;

sending the first test to the source by the first host using the packet information, obtaining an unsuccessful response to the first test by the host;

forwarding, by the host, the unsuccessful response to the edge device; and placing the first packet information on the second list based on the unsuccessful response to the first test;

receiving a second packet from the network by the edge device, wherein the second packet is directed to a second host;

after receiving the second packet:

analyzing, by the edge device, the second packet to obtain second packet information, wherein the second packet information identifies that the second packet was received from the source; and in response to determining that the second list comprises the source, dropping the second packet by the edge device.

20. The computer readable medium of claim 19, wherein the second packet is directed to the second host when the second host is to receive the second packet to comply with load balancing requirements specified by the edge device.

* * * * *